United States Patent [19]
Ryška et al.

[11] 3,893,952
[45] July 8, 1975

[54] CATALYST CARRIER IN PARTICULAR FOR APPLIANCES FOR REMOVING CARBON MONOXIDE FROM EXHAUST GASES OF INTERNAL COMBUSTION ENGINES

[75] Inventors: Josef Ryška, Ostrava; Jiři Frkal, Havirov; Eduard Kološ, Frydek-Mistek; Břetislav Panák, Ostrava; Lubomir Vágner, Ostrava; Miroslav Pospišil, Ostrava, all of Czechoslovakia

[73] Assignee: Ostravsko-karvinske doly, oborove reditelstvi, Ostrava, Czechoslovakia

[22] Filed: Nov. 14, 1972

[21] Appl. No.: 306,205

[30] Foreign Application Priority Data
Nov. 22, 1971 Czechoslovakia ............... 8120/71

[52] U.S. Cl. ......... 252/477 R; 252/455 R; 23/288 F
[51] Int. Cl. ...... B01j 11/40; F01n 3/14; B01j 11/46
[58] Field of Search..... 252/455 R, 477 R; 423/213; 23/288 F

[56] References Cited
UNITED STATES PATENTS
| | | | |
|---|---|---|---|
| 2,974,150 | 3/1961 | McClements et al. | 252/477 R |
| 3,495,950 | 2/1970 | Barber et al. | 252/477 R |
| 3,681,260 | 8/1972 | Foucher, Jr. et al. | 252/477 R |

Primary Examiner—Carl F. Dees
Attorney, Agent, or Firm—Burgess, Ryan and Wayne

[57] ABSTRACT

The catalyst carrier consists of heat resisting bodies of cylindrical formation, each provided with one or more through-going internal channels. The outer as well as the inner surface of the body is porous, consisting preferably of a ceramic mass and all surfaces are coated with a firmly adhering catalyst. The bodies with applied catalyst are loosely piled up in a chamber within a filter or exhaust silencer.

6 Claims, 6 Drawing Figures

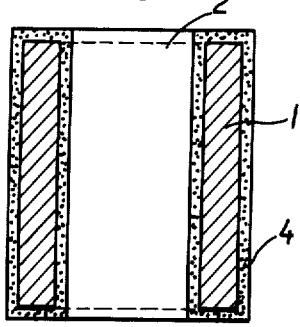
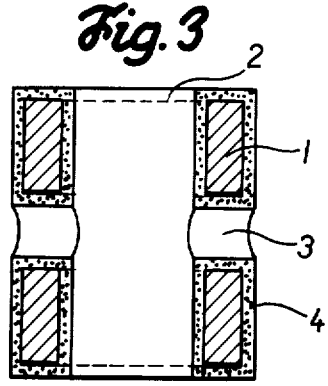
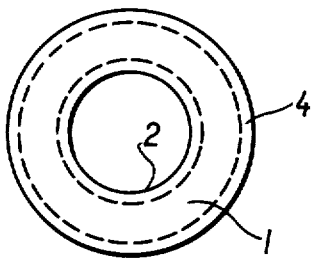
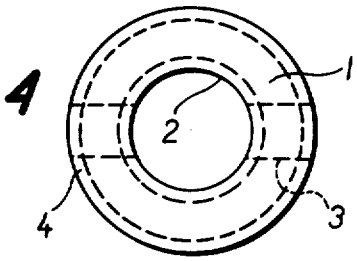
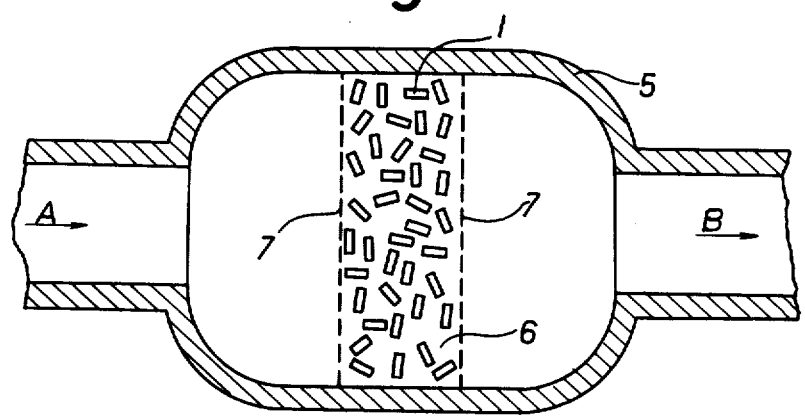
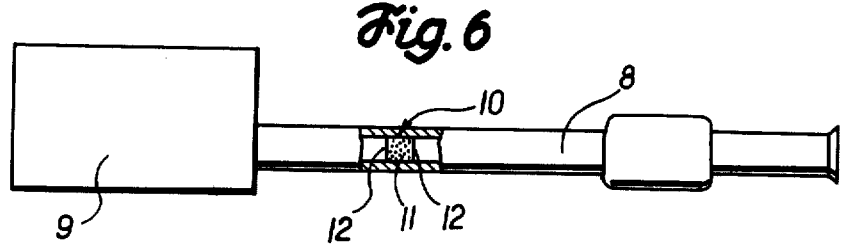

3,893,952

CATALYST CARRIER IN PARTICULAR FOR APPLIANCES FOR REMOVING CARBON MONOXIDE FROM EXHAUST GASES OF INTERNAL COMBUSTION ENGINES

BACKGROUND OF THE INVENTION

The known catalyst carriers intended for removing carbon monoxide from exhaust gases of internal combustion engines are made from various types of material, such as kieselguhr, asbestos, inert silicates, in particular aluminim silicate or attapulgit produced from aluminium silicate or sepiolite - meerschaum, consisting of magnesium silicate, further various types of clay or spongy granulated pumice or other carriers formed as balls having suitable diameters, mostly diameters from 4 to 8 mm. These are well as other types of materials serving for the production of catalyst carriers, are rather heavy due to their considerable own weight. It is to be noted that in order to remove a certain percentage of carbon monoxide from exhaust gases, a great number of carriers having a large volume and weight, has to be employed, which fact again adversely affects the appliances equipped with such carriers. It is further required that the catalyst carriers must not have a hydrocarbon dissolving or any polymerising effect or them or on other noxious substances, such as $NO_2$, $SO_2$, $SO_3$, $NO$, $N_2O_3$, $H_2S$ $O_4$, $H_2$ and condensation components in the vaporised phase, such as unburnt fuel, water, organic and inorganic acids, olefines, aldehydes, ketons, polycondensation products, soot and ashes.

All the aforementioned types of known catalyst carriers are liable to reduce in any case the performance of internal combustion engines, due to the considerable resistance which they offer to the discharge of exhaust gases.

It has already been proposed to produce catalyst carriers in the shape of balls, for example glass balls, but such carriers have not yielded the expected results. Balls are in permanent mutual contact and as a result of the considerable pressure exerted by the exhaust gases when discharged from the engine, the catalyst applied on the balls soon wears off, so that the filling or bed of a filter or any other apparatus housing the catalyst carriers loses its efficiency within a relatively short time.

Various types of the so-called combustion processes for the removal of CO from exhaust gases have not proved successful for the main reason that the apparatus required for such a process has large dimension and volume weight.

SUMMARY OF THE INVENTION

It is an object of the invention to mitigate the disadvantages set forth above.

The essence of the invention resides therein that the catalyst carrier consists of a heat-resisting body provided with a least one through-going internal channel, the outer as well as the inner surface of the body being porous and coated with a firmly adhering catalyst.

The provision of a through-going channel in the body is advantageous, since when such bodies are piled up in a filter, exhaust silencer or in any apparatus serving for the reduction of the carbon monoxide content, the danger of the catalyst being rubbed off the bodies (as happens with the known ball-shaped bodies) is greatly reduced. The catalyst coating the walls of an inner channel, as proposed by the invention, is protected by the walls of the carrier against wearing off. The surface, on which the oxidation of CO to $CO_2$ takes place, is enlarged at the same time. It is another advantage of this arrangement that the resistance against the discharge of exhaust gases is relatively small.

The porous surface of the bodies offers the advantage, that the applied catalyst adheres perfectly to the surface of the bodies, which counteracts its rubbing off from the outer surface. Most important, however, is the fact that any rubbing off in the interior of the channels is prevented, because the inner surfaces are not exposed to any mechanical forces except the passage of gases. The bodies can be porous either throughout their mass or at their surface only.

The material, from which the bodies are made, must be heat resisting and mechanically strong, in order to with-stand not only the high temperatures but also the impacts of the exhaust gases, as well as shocks occurring during travel of the machine.

Such a material is preferably a ceramic mass, which is not only heat resisting but absorbs and accumulates also the heat required for the oxidation process and due to its heat insulating properties retains such heat. The ceramic mass being light in weight, a filter or silencer filled with ceramic bodies is not heavy. If necessary, the bodies can be made of another suitable material and coated with a porous, perferably ceramic mass.

According to the invention bodies of cylindrical shape are given preference. Such bodies are freely piled up in a chamber provided in the filter or silencer, so that their lingitudinal axes are oriented in all directions. The mutual contact of the bodies occurs on a very small area, with the result that the effective surface for the contact of exhaust gases with the catalyst applied to the inner outer surfaces of the bodies is very large.

A cylindrical surface answers better the purpose than any other surface, such as a prismatic one, where the prisms would lie on one another with their whole walls, which would lead to a reduction in the effective surface of the catalyst covered walls of the carrier. With ball-shaped bodies there is the risk of one ball blocking the channel of the neighbouring ball, apart from the fact that the effective outer surface of a ball in proportion to the inner surface of the channel is larger than in a cylindrical body, so that the danger of wear is greater.

A further disadvantage of ball-shaped bodies is the regularity of their deposition, when piled up, which is adverse to the permeability of the ball layer.

A ceramic mass is more suitable than for instance glass or other smooth materials, to which the catalyst does not properly adhere.

The catalyst carrying body can be provided with one or more inner channels, which can have various shapes. Satisfactory results have been achieved with a cylindrical channel arranged coaxially with the outer surface of the cylindrical body. If required, one or more further transverse channels or longitudinal channels, optionally of honeycomb cross-section, can be provided.

It is desirable that the bodies should have thin walls, i.e. not only the outer walls of the bodies should be thin, but it there are several channels provided in the body, the partitions between them should have the smallest possible thickness. The minimum wall thickness is given by the required mechanical strength of the body. The wall thickness should not exceed the diameter of the channel, but as a rule is chosen smaller.

The length of the bodies also affects the effectiveness of the catalytic process. The bodies should not be too long, in order to prevent their regular deposition when piled up, as this would reduce the effective surface. The length of the bodies should not exceed about three times their outer diameter and is preferably chosen equal the outer diameter.

The bodies according to the invention can be deposited either directly in an exhaust silencer or in a filter, fitted in the exhaust pipe as near the engine as possible, so that the bodies are subjected to the highest possible temperature of the gases.

BRIEF DESCRIPTION OF THE DRAWING

An exemplary embodiment of the invention is shown in the accompanying drawing, wherein FIG. 1 is a cross-sectional view of the catalyst carrying body, FIG. 2 is the corresponding plan view, FIG. 3 is a cross-sectional view of a modified embodiment of the body, FIG. 4 is the corresponding plan view, FIG. 5 is a diagrammatic longitudinal section of an exhaust silencer, housing the new bodies, and FIG. 6 is a diagrammatic representation of the arrangement of a filter in the exhaust pipe of an internal combustion engine.

DESCRIPTION OF A PREFERRED EMBODIMENT

The catalyst carrier according to the invention consists of a thin-walled cylindrical body 1, as shown in FIGS. 1 to 4. In the embodiment illustrated in FIGS. 1 and 2, the body 1 is provided wth a through-going channel 2, which is coaxial with the outer surface of the body 1. It is obvious that the channel need not be exactly cylindrical, but may be tapered on one or both sides.

FIGS. 3 and 4 represent a further example, wherein the body 1 is provided with a transverse channel 3 in addition to the longitudinal channel 2.

The catalyst carrier consists preferably of thin-walled, non-glazed ceramic bodies with through-going channels 2 or 3. A satisfactory material for the production of such bodies is steatit or a hard, non-glazed porcelain as used in electrical engineering. However, other similar materials can be used as well.

The bodies 1 have preferably an outer diameter of 2,7 mm and over and the channel 2 a diameter of 1,4 mm and over.

The catalyst carrier is first freed from moisture, preferably by drying at a temperature of about 120°C and then placed in a vessel filled with a solution of a suitable catalyst. The catalyst may be, for example, a mixture of carbonates, such as $MnCO_3 + CuCO_3 \cdot Cu(OH)_2$. The carbonates are decomposed by means of concentrated nitrid acid and converted into nitrates. The solution together with the bodies 1, is thoroughly mixed, so that each body 1, having a channel 2 or 3, is entirely surrounded by the catalyst at its outer and inner surfaces. The bodies are then spread out for drying at a temperature of 120° to 150°C, whereupon after drying the temperature is raised over 300°C, which is necessary for a decomposition of the nitrates and is also suitable for the supply of oxygen, in order to increase the oxidising power of the atmosphere. The catalyst, applied in this way in a thickness of 0,001 mm and over, adheres firmly to the bodies 1, forming a layer 4 on the whole inner and outer surface of the bodies.

The catalyst is resistant not only against rubbing off and impacts by the exhaust gases from the engine, but due to its adhesive power and hardness meets all requirements placed on a catalyst for the envisaged purposes. The high adhesive strength of the catalyst on the body 1 is due to the porosity of the outer and inner surfaces of the body 1.

In addition to other advantages obtained by the use of thin-walled, unglazed, porous ceramic bodies there is another favorable aspect in that a possible slight reduction of the applied amount of catalyst on the outer surface of the body 1 is entirely negligible, because the catalyst applied to the channel 2 or 3 remains intact. The efficiciency of the catalyst applied to the carrier according to the invention is thereby maintained to more than 90 percent over a considerable period of time.

When the efficiency of the catalyst on the carrier drops by more than 10 percent - which can be ascertained by regularly performed checks of the exhaust gases - then such a 10 percent reduction in efficiency has to be considered as a signal that a remedy is needed. When diesel engines are concerned, such remedy can be effected by cleaning the surface of the catalyst from adhering carbon deposits, for example by washing in a benzol bath, burning out and rinsing of the carrier in warm water and subsequent slow drying of the carrier at a temperature of up to 120°C. The carrier with the applied catalyst is the again prepared for use with undiminished efficiency.

In connection with gasoline engines the efficiency of the catalyst is usually impaired by the presence of lead containing or other substances. In such cases it is best to exchange the used catalyst for a new one.

In order to determine the number of catalyst carriers required either for a filter or an exhaust silencer or another apparatus, it is first necessary to ascertain the percentage of carbon monoxide in the exhaust gases and, by means of a laboratory analysis, to fix the optimum weight of the catalyst carriers with applied catalyst.

Laboratory analyses of exhaust gases from internal combustion engines, effected after fitting a silencer or filter containing the new bodies, have shown that highly satisfactory results are obtained with a catalyst carrier consisting of thin-walled ceramic not-glazed porous bodies according to the present invention.

FIG. 5 illustrates the use of the new bodies in an exhaust silencer.

A chamber 6 is provided in the interior of a silencer body or container 5, said chamber 6 being defined by two perforated walls 7,7. The chamber 6 is filled with bodies 1. Exhaust gases enter the silencer in the direction of the arrow A, pass through the chamber 6, where the conversion of CO into $CO_2$ occurs, and escape in the direction of the arrow B.

FIG. 6 shows diagrammatically an arrangement in which the bodies 1 are used as a filter. In the exhaust pipe 8 of an internal combustion engine 9 a filter or container 10 is placed as near as possible to the engine. A chamber 11 in the filter, defined by perforated or other permeable walls 12,12, such as wire netting, is filled with bodies 1 carrying the catalyst 4. Exhaust gases pass through the chamber 11, in which the conversion of CO into $CO_2$ occurs under favorable conditions, because the exhaust gases at this place show the highest temperature and therefore warm the bodies 1 very effectively.

In connection with gasoline engines it is necessary to supply oxygen to the catalyst in the filter or silencer, in order to achieve a complete conversion of CO into $CO_2$.

If desired, another active material removing also other noxious substances from the exhaust gases can be applied on the new bodies 1, as will be obvious to those skilled in the art.

The advance achieved by the present invention is to be seen primarily in the fact that the bodies provided with one or more internal channels are very well suited for the application of a catalyst. When loosely piled in a filter, silencer or another apparatus or in a part thereof, the new bodies show the highest efficiency and longest lifetime, as compared with known catalyst carriers, apart from lending to the catalyst a considerable wear resistance and offering a relatively small resistance to the passage of exhaust gases, while reducing the noise caused by these gases. All this contributes to a considerable reduction of the carbon monoxide content in the exhaust gases of internal combustion engines, e.g. of motor-cars, trucks, mine locomotives, loaders and other transport vehicles, which are equipped either with gasoline or a diesel engines.

We claim:

1. Catalyst carrier for use in an apparatus for the removal of carbon monoxide from the exhaust gases of internal combustion engines, said carrier consisting of a plurality of heat-resistant porous ceramic bodies having catalytic material deposited on all surfaces thereof and having catalyst material impregnating the pores of said bodies, each said body having a cylindrical shape and at least one axial internal through channel, the wall thickness of said body not exceeding the diameter of the axial through channel, said bodies being freely placed in said carrier.

2. Catalyst carrier for use in the working chambers of appliances for removing carbon monoxide from exhaust gases of internal combustion engines, comprising a plurality of porous elements, at least the majority of said elements having a cylindrical shape and an axial channel, each said element being provided with a catalyst on the outer and inner surfaces thereof, said catalyst also being impregnated in the pores of each said element, said elements being freely piled in said working chamber.

3. Catalyst carrier according to claim 2 wherein the length of each element is equal to or less than three times its outer diameter.

4. Catalyst carrier as in claim 2, wherein the length of each element does not exceed three times the outer diameter of the body.

5. Catalyst carrier as in claim 2, wherein each element is provided with a single cylindrical through channel, whose longitudinal axis is coaxial with the longitudinal axis of the carrier body.

6. Catalyst carrier as in claim 2, wherein each element is provided with at least one through channel transverse to the longitudinal axis of the carrier body.

* * * * *